United States Patent
Wang et al.

(10) Patent No.: US 7,688,878 B2
(45) Date of Patent: Mar. 30, 2010

(54) METHOD AND DEVICE OF PEAK DETECTION IN PREAMBLE SYNCHRONIZATION FOR DIRECT SEQUENCE SPREAD SPECTRUM COMMUNICATION

(75) Inventors: Xinyu Wang, Newbury Park, CA (US);
Marcus R Gahler, Redmond, WA (US);
Igor Elgorriaga, Los Angeles, CA (US);
Robert P. Higgins, Seattle, WA (US);
Paul R. Norris, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 863 days.

(21) Appl. No.: 11/308,327

(22) Filed: Mar. 16, 2006

(65) Prior Publication Data

US 2009/0323766 A1    Dec. 31, 2009

(51) Int. Cl.
*H04B 1/00* (2006.01)
(52) U.S. Cl. .................. 375/130; 375/228; 375/137; 375/365; 375/340; 455/415; 370/526
(58) Field of Classification Search ............... 375/346
See application file for complete search history.

(56) References Cited

U.S. PATENT DOCUMENTS

| | | | |
|---|---|---|---|
| 5,305,347 A * | 4/1994 | Roschmann et al. | 375/150 |
| 5,912,931 A * | 6/1999 | Matsumoto et al. | 375/340 |
| 6,047,016 A * | 4/2000 | Ramberg et al. | 375/148 |
| 6,282,232 B1 | 8/2001 | Fleming et al. | |
| 6,304,515 B1 * | 10/2001 | Spiesberger | 367/124 |
| 6,356,607 B1 | 3/2002 | Scott et al. | |
| 6,493,376 B1 | 12/2002 | Harms et al. | |
| 6,724,834 B2 | 4/2004 | Garrett et al. | |
| 6,816,543 B1 | 11/2004 | Shibuta | |

(Continued)

OTHER PUBLICATIONS

M.Katz et al., "Code Acquisition in Advanced CDMA Networks",ISBN 951-42-6883-0, Oulu University Press, Oulu, Finland, 2002.

(Continued)

*Primary Examiner*—Shuwang Liu
*Assistant Examiner*—Lihong Yu
(74) *Attorney, Agent, or Firm*—Brosemer, Kolefas & Assoc., LLC; Baldwin D. Quan

(57) ABSTRACT

A spread-spectrum preamble synchronization peak detection system performs multiple statistical tests based on instant and time-averaged channel condition measurements to identify the synchronization peak. In a normalized peak-to-average test, a peak-to-average ratio measurement is normalized by a signal-to-noise ratio measurement to form a new statistical measure which effectively eliminates the impact of the wide dynamic range of the signal-to-noise ratio of the received samples. A transition SNR test is used to eliminate potential false alarms caused by spurious PARN peaks during the transition period at the onset of preamble arrival. Code-phase aligned time-averaging is used to estimate the signal and noise levels over a sliding window. The code-phase alignment of samples effectively separates signal and noise samples in the averaging process, and resulting in more accurate signal and noise measurements. In estimating noise levels, the system takes multi-path interference into account by excluding both the peak signal and the side-lobe signals caused by multi-path wireless channels, resulting in more accurate estimation of noise level.

16 Claims, 13 Drawing Sheets

U.S. PATENT DOCUMENTS

| | | | |
|---|---|---|---|
| 6,934,327 | B1 * | 8/2005 | Whited et al. ............... 375/225 |
| 6,965,586 | B1 | 11/2005 | Maruyama |
| 6,985,821 | B2 * | 1/2006 | Kawabata .................... 702/64 |
| 7,058,144 | B2 * | 6/2006 | Baldwin ..................... 375/346 |
| 2002/0149513 | A1 * | 10/2002 | Chaput et al. ............... 342/125 |
| 2005/0111561 | A1 * | 5/2005 | Sedarat et al. .............. 375/260 |
| 2005/0254559 | A1 * | 11/2005 | Hou et al. .................. 375/150 |

OTHER PUBLICATIONS

S.G.Glisic et al., "Automatic Decision Threshold Level Control in Direct-Sequence Spread-Spectrum Systems", IEEE Trans. Comm., vol. 39, No. 2, pp. 187-192, Feb. 1991.

E. Brigant et al., "Adaptive Threshold Control Scheme for Packet Acquisition", IEEE Trans. Comm., vol. 46, No. 12, pp. 1580-1582, Dec. 1998.

J.H.J. Ilnatti, "On the Threshold Setting Principles in Code Acquisition of DS-SS Signals", IEEE J. Selected Areas in Comm., vol. 18, No. 1, pp. 62-72, Jan. 2000.

E.Stoll et al., "A Contribution to the Multiple-Polarity Coincidence Detection Schemes", IEEE Trans. Comm., vol. 16, No. 5, pp. 676-682, Oct. 1968.

Y.S.Poberezhskiy et al., "Estimate of the Time Taken to Reach a Threshold in Digital Stores Using the Sliding Window Algorithm", Radio Electronics and Communications Systems, vol. 24, No. 7, pp. 87-89, Jul. 1981.

P.F. Driessen et al., "A New Rapid Acquisition Scheme for Burst Mode DS Spread Spectrum Packet Radio", Proc. of IEEE Military Comm. Conf., vol. 2, pp. 809-813, Nov. 1991.

M.K.Park et al., "Performance of Serial Acquisition Schemes using Antenna Arrays in the DS-SS System", Proc. of IEEE Global Telecom. Conf., vol. 1, pp. 195-200, Nov. 1998.

S.G.Glisic et al., "Automatic Decision Threshold Level Control in Direct-Sequence Spread-Spectrum Systems", IEEE Trans. Comm., vol. 36 No. 4, Apr. 1988.

* cited by examiner

METHOD AND DEVICE OF PEAK DETECTION IN PREAMBLE SYNCHRONIZATION FOR DIRECT SEQUENCE SPREAD SPECTRUM COMMUNICATION

FIELD OF THE INVENTION

The present invention relates generally to Direct Sequence Spread Sequence (DSSS) communication methods and systems and in particular, to methods and systems of detecting preamble sequences.

BACKGROUND INFORMATION

For more than half a century, Direct Sequence Spread Spectrum (DSSS) technology has been widely used in both military and commercial communications. In DSSS, information data is spread by a pseudo-random (PN) sequence at the transmitter. At the receiver, the received signal is despread by an identical copy of the PN sequence to recover the original information data buried in the noisy received signal.

In this process, it is critical to align the code phase of the PN sequence as applied at the receiver with the code phase of the PN sequence embedded in the received signal. To achieve this goal, a preamble sequence is typically transmitted ahead of the information data. With a priori knowledge of the preamble sequence being transmitted, the preamble synchronization unit at the receiver can detect the arrival of the preamble and subsequently synchronize the code phase of the local PN sequence with that in the received signal.

The latest DSSS communication systems typically use concatenated sequences in the preambles to achieve fast and reliable synchronization. A concatenated sequence is formed by a Kronecker product between an inner code sequence and an outer code sequence. These code sequences have favorable periodic or aperiodic autocorrelation characteristics in that they are capable of suppressing correlation side-lobes.

Preamble synchronization operation at the receiver, as applied to the arrival concatenated preamble sequence, typically consists of a two-step correlation processing to accumulate signal energy and a subsequent synchronization detection processing to capture the preamble arrival occurrence from the correlation outputs. At the first correlation step, the received sequence passes through an inner code matched filter module which produces a train of correlation spikes corresponding to repetitive inner code sequences in the preamble. At the second correlation step, output from the inner code matched filter module passes through an outer code matched filter module. When the entire preamble sequence arrives, the train of correlation spikes matches the outer code matched filter coefficients and a correlation peak is generated. The preamble synchronization is detected by identifying the occurrence of this correlation peak. Several approaches have been proposed for correlation peak detection.

The first approach to capture the correlation peak is through signal energy differentiation. Specifically, the output signal from the outer code matched filter with time-varying amplitude is continuously tested against a threshold value. When the amplitude surpasses the threshold, the correlation peak is identified and preamble synchronization is declared. The threshold can be either set to a fixed value or adaptively adjusted based on statistical noise measurements. The theoretical Neyman-Pearson decision criterion is typically employed in choosing a threshold that keeps the probability of false alarms constant, as embodied in various Constant False Alarm Rate (CFAR) algorithms. The chosen threshold value $2\sigma^2 \times \log_e(1/P_{FA})$ is essentially a function of the noise power estimate $\sigma^2$ and the probability of false alarm $P_{FA}$.

The majority of synchronization peak detection methods for the concatenated preamble sequence employ variants of the CFAR algorithms. These methods first measure the time-averaged amplitude of the output signal at the outer code matched filter, and then employ a simple peak-to-average ratio test to detect the correlation peak. The instantaneous peak-to-average ratio, which provides a rough estimate of the instantaneous signal-to-noise ratio (SNR) of the output signal samples, is expected to jump to its maximum value at the instance when the entire preamble sequence arrives in the correlation structure. Such synchronization peak detection schemes work well in most commercial applications in which the dynamic range of the SNR at the receiver is limited. The limited dynamic range of the SNR at the receiver makes it relatively easy to select a threshold for the peak-to-average ratio test.

Such synchronization peak detection schemes also work well in many existing military radios which are designed to have limited operational capabilities characterized in part by a limited set of spreading ratios. The limited set of spreading ratios confines the dynamic range of the SNR at the receiver and therefore permits the simple peak-to-average ratio test to effectively detect the synchronization peak.

Future radios promise to revolutionize military radio communications by providing a rich set of wireless communication capabilities within a single radio to accommodate various operational scenarios. A single radio is expected to provide a rich set of configurations, including a wide range of spreading ratios, a large set of configurable spectrum allocations, adjustable transmission duration for burst communication, and various data rates ranging from several Kbps to hundreds of Mbps. Future military radios also promise to operate in extremely variable wireless communication environments, which include jamming, severe channel fading, significant Doppler frequency shift and Doppler rate change, and various multi-path propagation delays, among other phenomena.

The wide range of radio operational configurations coupled with variable channel environments result in extremely wide dynamic ranges of both the SNR and the magnitude of the received signal. This makes it very difficult to select an appropriate threshold to satisfy all situations using the simple peak-to-average ratio test, given that the receiver does not have knowledge of operational configurations at the transmitter. If the threshold is set too low, correlation side-lobes may pass the threshold test and cause false alarms. If the threshold is set too high, true peaks may elude the peak-to-average ratio test and cause synchronization misses.

A widely-used solution that has been proposed is to set a conservative threshold, in order to avoid synchronization detection misses, then, after a threshold crossing event has occurred, employing an extended peak validation period to weed out false alarms. This solution partially alleviates the problem caused by the wide-dynamic-range SNR, but at the expense of increased synchronization detection time and the additional buffer space required to temporarily store information data that immediately follows the preamble sequence. Moreover, this solution does not work well for modern burst wireless communications which transmit information in short bursts and demand rapid synchronization detection.

A second approach to capture the correlation peak is through a hard-decision-aided two-step detection. The first step is the inner code detection, in which a train of correlation spikes corresponding to repetitive inner code sequences in the preamble in the preamble are set to "+1" by a hard-decision slicer while the rest of the sample are set to "−1". In the second step, information associated with the bi-polar sequence is further processed in the outer code matched filter for final synchronization detection. The second step is further categorized into two subgroups based on which aspects of the hard-decision sequence information are being used in the second step. Methods in the first subgroup simply utilize the bi-polar value for correlation processing in the outer code matched filter. Methods in the second subgroup utilize the position index information of the "+1" samples in the hard-decision sequence and employ an index coincident decision rule for synchronization detection.

With the help of the hard-decision, the aforementioned second approach avoids the wide dynamic range problem that hinders the aforementioned first approach with signal energy differentiation. However, the second approach encounters its own problems, including poor performance under low SNR conditions due to the limited coherent energy accumulation, the poor probability of a false synchronization before the preamble signal arrives as well as the necessity to delay the peak detection decision by adding an extended peak validation period.

A third approach to capture the correlation peak is through the measuring of the threshold-crossing event statistics in a sliding window. If a certain number of threshold-crossing events occur in a sliding window, the correlation peak is detected. This approach has drawbacks similar to those of the aforementioned second approach.

Beyond their individual drawbacks, all three aforementioned synchronization peak detection approaches do not fully exploit the unique concatenated structure embedded in the received sequence. For example, in calculating the time-averaged amplitude in the peak-to-average ratio test, the periodic repeating signal structure is ignored and the signal component is leaked into the noise power estimation.

SUMMARY OF THE INVENTION

The present invention provides methods and systems for peak detection in preamble synchronization to solve the problems associated with a wide dynamic range signal-to-noise ratio (SNR) without introducing additional delay in making the synchronization peak detection decision. Methods and systems in accordance with the present invention provide robust and prompt synchronization peak detection for Direct Sequence Spread Sequence (DSSS) communications in a wide range of wireless channel conditions and radio communication system operational configurations. The methods and systems of the present invention are robust in that they can cope with a wide range of preamble signal strength and SNR at the receiver and can automatically adapt to unknown wireless channel conditions and communication system configurations. The methods and systems of the present invention are prompt in that they detect and declare a synchronization correlation peak immediately upon the reception of the entire preamble sequence without incurring additional delay and buffer space to perform peak validation. The methods and systems of the present invention also fully exploit the unique structure of the concatenated sequence used in the preamble to derive accurate estimations of the signal and noise levels.

In an exemplary embodiment, a method and device in accordance with the present invention perform instant and time-averaged channel condition estimations and employ four statistical tests to detect the synchronization peak. The estimations measure the received signal strengths and the noise powers over two different time scales. Results from channel condition estimations are utilized in four statistical tests designed to distinguish the synchronization peak from side-lobes and noise samples. In these four tests, various statistical aspects that help peak distinction are exploited. The test results are subsequently combined to make a final decision as to the presence of the preamble.

The above and other embodiments of the present invention are described in greater detail below.

DETAILED DESCRIPTION

Figure 1:
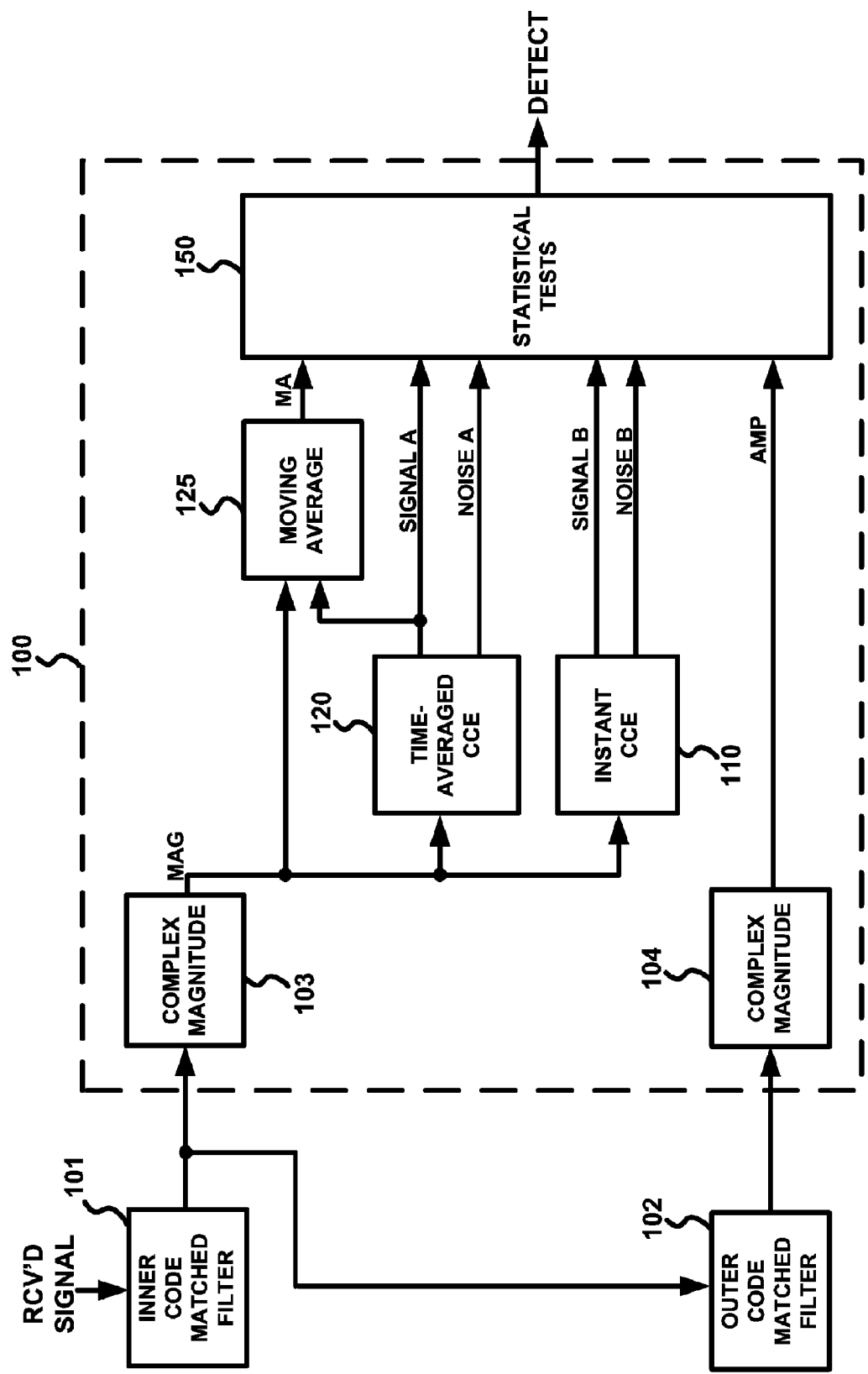
FIG. 1 shows a block diagram of an exemplary embodiment of a preamble peak detection apparatus in accordance with the present invention.
Figure 6A:
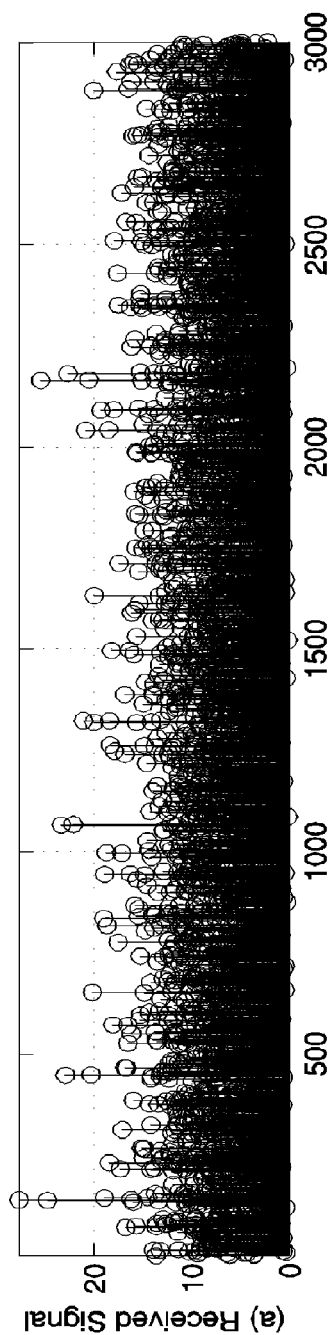
FIGS. 6A-6C show exemplary waveforms of the magnitude of the received signal entering the inner code matched filter block, the magnitude of the output signal at the inner matched filter block, and the magnitude of the output signal at the outer code matched filter block, respectively, of the preamble peak detection apparatus of FIG. 1.
Figure 6B:
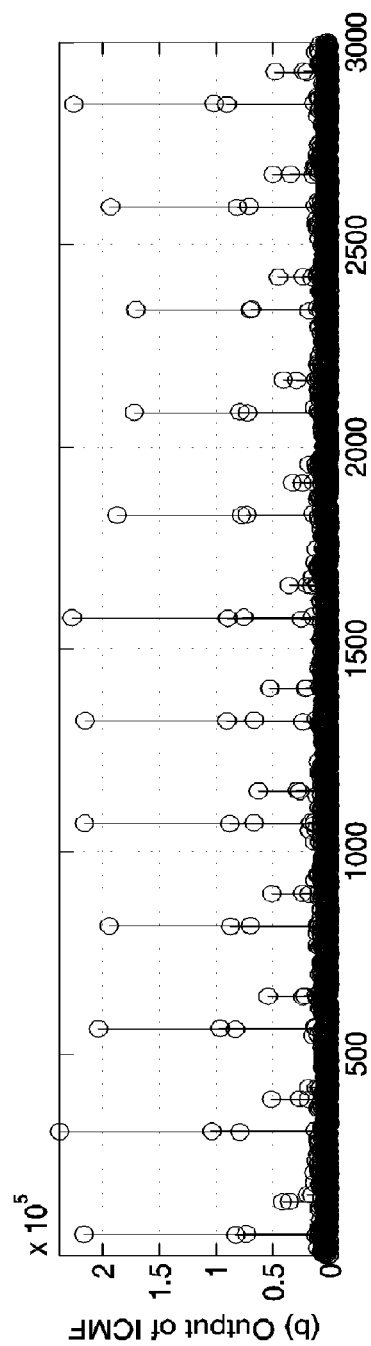
Figure 6C:
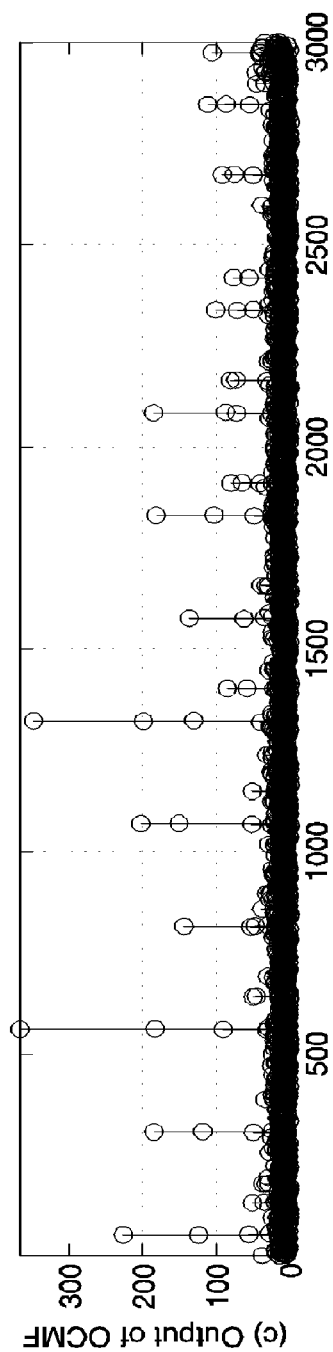

FIG. 1 shows a block diagram of an exemplary embodiment of a preamble peak detection system 100, in accordance with the present invention. The system 100 operates on signals provided by an inner code matched filter (ICMF) block 101 and from signals provided by an outer code matched filter (OCMF) block 102. The ICMF block 101 includes inner code matched filtering as well as demodulation that removes phase rotation. The arrangement, implementation and operation of the ICMF 101 and OCMF 102 are well-known in the art. Exemplary waveforms of the magnitude of signals at the input of the ICMF block 101, the output of the ICMF block 101, and the output of OCMF block 102 are shown in FIGS. 6A-6C, respectively.

As shown in FIG. 1, the exemplary preamble peak detection system 100 includes two complex magnitude blocks 103 and 104, an instant channel condition estimation (CCE) block 110, a time-averaged CCE block 120, a moving average block 125 and a statistical tests block 150.

The output of the ICMF 101 is provided to the complex magnitude block 103 which determines the magnitude of the signal and provides that to the instant CCE block 110, the time-averaged CCE block 120, and the moving average block 125.

Instant channel condition estimation is performed on the output of the complex magnitude block 103 by the instant CCE block 110. Due to the use of concatenated codes in the preamble sequence, the magnitude of the output signal of the ICMF block 101 exhibits a periodic pattern which repeats itself over one inner code sequence interval. The inner code sequence length has N samples, which equals the number of chips of the inner code sequence multiplied by the oversampling ratio of the communication system. Within each period, there is a sample with peak magnitude which, in a statistical sense, corresponds to the correlation peak of the received inner code sequence and the inner matched filter coefficients, and a plurality of samples with sub-peak magnitudes which, in a statistical sense, correspond to the multi-path delayed and attenuated copies of the main correlation peak. The remaining samples in each period are noise samples. The maximum number of sub-peak samples within each period that the present invention can process is denoted as H, wherein $H \geq 0$.

An exemplary waveform of the magnitude of the ICMF output is shown in FIG. 6B with exemplary embodiments of H=1 sub-peak sample in each period, and N=254 samples of inner code sequence length.

In the embodiment of FIG. 1, an instant signal level, SIGNAL B, is estimated from the peak magnitude sample within an inner code sequence interval, and an instant noise level, NOISE B, is estimated from the noise samples in an inner code sequence interval. In estimating NOISE B, both the peak sample and its pulse shaping components and a plurality of sub-peak samples are excluded. Hence, more accurate noise estimation is obtained, as compared to conventional noise estimation methods that do not differentiate multi-path signals from noise. The instant signal and noise estimation procedure is repeated over each non-overlapping inner code sequence interval.

Figure 3:
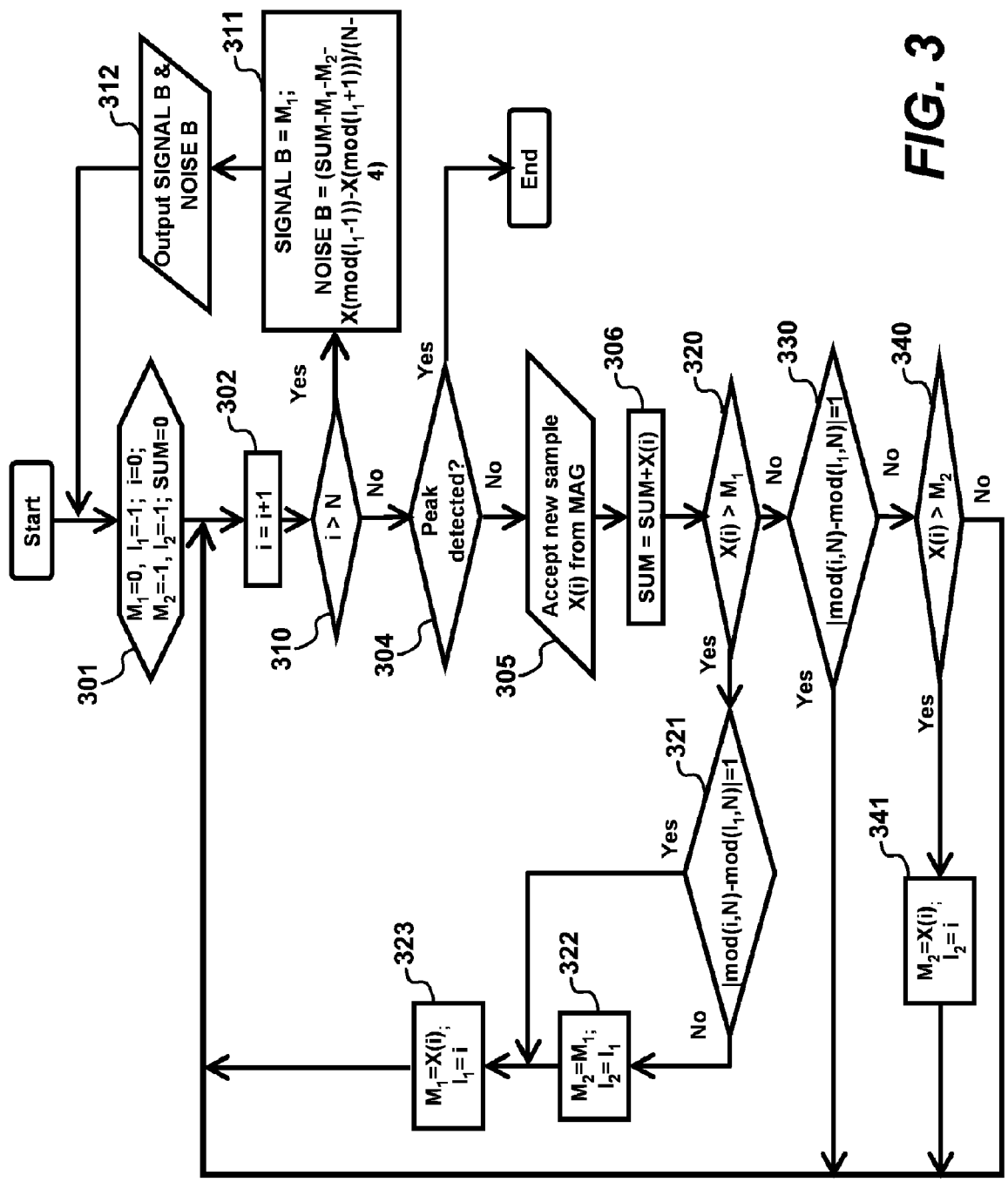
FIG. 3 shows a flow chart illustrating the operation of an exemplary embodiment of an instant channel condition estimation block of the preamble peak detection apparatus of FIG. 1.

A flow chart illustrating the operation of an exemplary embodiment of the instant CCE block 110 is shown in FIG. 3. The instant CCE block 110 takes the MAG output of the complex magnitude block 103 and produces SIGNAL B and NOISE B as outputs. In an exemplary embodiment, each period has one sub-peak sample, i.e., H=1, with additional multi-path copies of the main peak being treated as noise samples.

As shown in FIG. 3, an initialization step 301 assigns initial values for a peak value $M_1$, a sub-peak value $M_2$, a peak index $I_1$, and a sub-peak index $I_2$. Loop control blocks 302 and 310 cause a total of N samples to be processed within an inner code sequence interval. If the current sample is the $N^{th}$ sample, operation branches to block 311 to calculate the SIGNAL B and NOISE B values based on N and the current values of $M_1$, $M_2$, and $I_1$. The values of SIGNAL B and NOISE B are output at step 312 and operation returns to step 301 to start a new round of CCE.

If it is determined at step 310 that the current sample is not the last sample in the current interval, operation proceeds to step 304 in which a determination is made as to whether the preamble peak has been detected; i.e., whether the statistical tests block 150 (FIGS. 1 and 2) has asserted the DETECT signal. If so, the CCE processing is terminated, otherwise, operation proceeds to step 305 to acquire a new sample value X(i) and continues to step 306 to accumulate X(i) into the partial sum SUM. Then, at step 320, a determination is made as to whether the new sample value X(i) is larger than the current peak value $M_1$. If so, steps 321, 322 and 323 update the current peak value $M_1$ and index $I_1$, with new sample value X(i) and new index i. Accordingly, the sub-peak $M_2$ and index $I_2$ are adjusted in step 322 if it is determined at step 321 that the new sample is not adjacent to the current peak sample.

If it is determined at step 320 that X(i) is not larger than $M_1$ and if it is determined at step 330 that the new sample is adjacent to the current peak sample, operation loops back to step 302. Otherwise, the new sample value is compared to the sub-peak value $M_2$ at step 340. If the new value is larger than $M_2$, sub-peak value $M_2$, and index $I_2$ are updated at step 341 before looping back to step 302.

The time-averaged channel condition estimation is performed on the output sequence MAG of the complex magnitude block 103 by the time-averaged CCE block 120. Instead of estimating signal and noise levels directly from the output sequence, the output sequence is first time-averaged over a plurality of L inner code sequence intervals before estimation, so as to increase the processing gain. In an exemplary embodiment, L=16.

The time-averaging is performed in a code-phase aligned manner at each code phase position within an inner code sequence interval. Specifically, samples from each inner code sequence interval are distinguished by their relative positions, i.e., code phase, within the interval. Samples with the same code phase from a plurality of inner code sequence intervals are properly aligned and averaged as a group. After the averaging process that results in one average value at each code phase position, the signal and noise levels SIGNAL A and NOISE A are estimated from these average values using a method similar to that described above for estimating SIGNAL B and NOISE B. The time-averaged signal and noise estimation procedure is repeated each time a new sample arrives.

The code-phase aligned time-averaging method implemented by the block 120 exploits the periodical features of signals at the output of the complex magnitude block 103 when a concatenated PN sequence is used as the preamble. The code-phase alignment of samples effectively separates signal and noise samples in the averaging process, resulting in more accurate signal and noise measurements.

Figure 4:
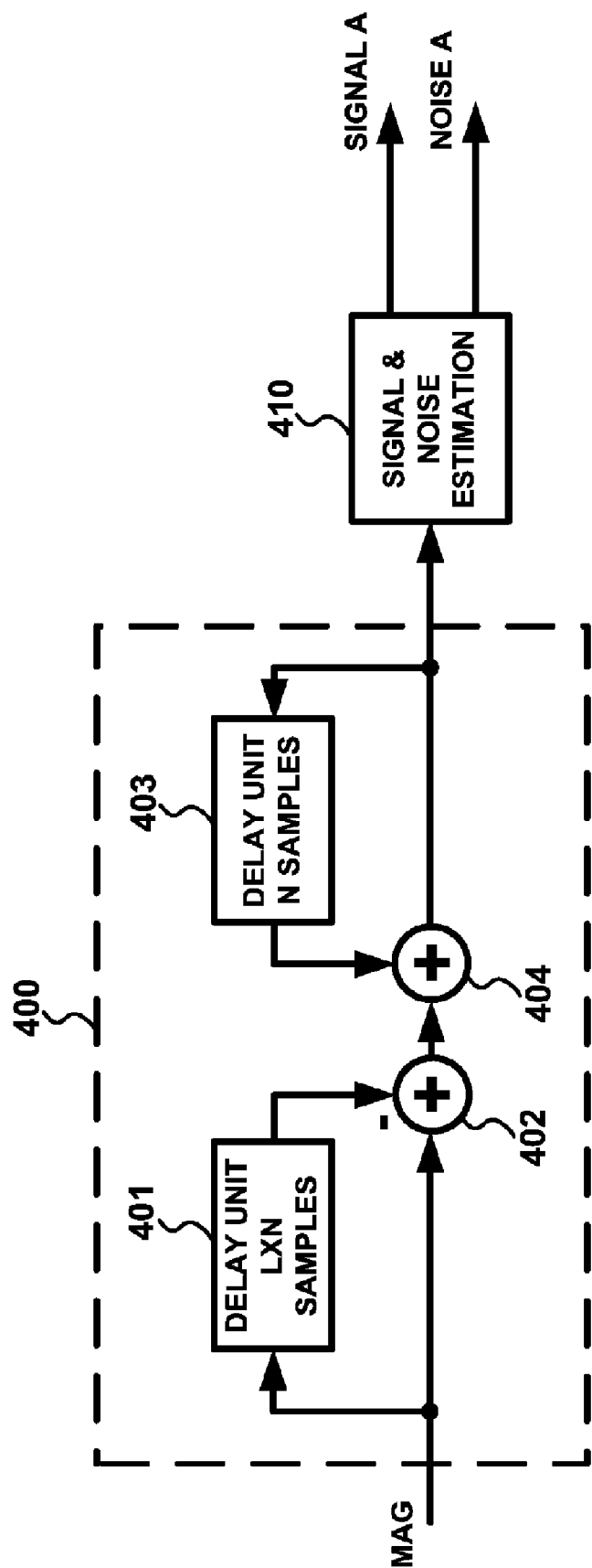
FIG. 4 shows a block diagram of an exemplary embodiment of a time-averaged channel condition estimation block of the preamble peak detection apparatus of FIG. 1.

A block diagram of an exemplary embodiment of the time-averaged CCE block 120 is shown in FIG. 4. The exemplary time-averaged CCE block shown includes an infinite impulse response (IIR) filter block 400 and a sample and noise estimation block 410. The IIR filter block 400 includes a delay block 401 having a delay of L×N samples, which determines the window size of the time-averaged CCE. The IIR filter 400 includes a second delay block 403 having a delay of N samples, which determines the number of distinguishable code phases. This number should be equal to the length of the inner code sequence interval. The signal and noise estimation block 410 employs the same processing as described by the flow chart in FIG. 3.

As shown in FIG. 1, the time-averaged CCE block 120 provides an output signal SIGNAL A to the moving average block 125. In conjunction with the output of the complex magnitude block 103, the moving average block 125 generates a moving average value MA. MA is indicative of the noise level on the channel.

Figure 5:
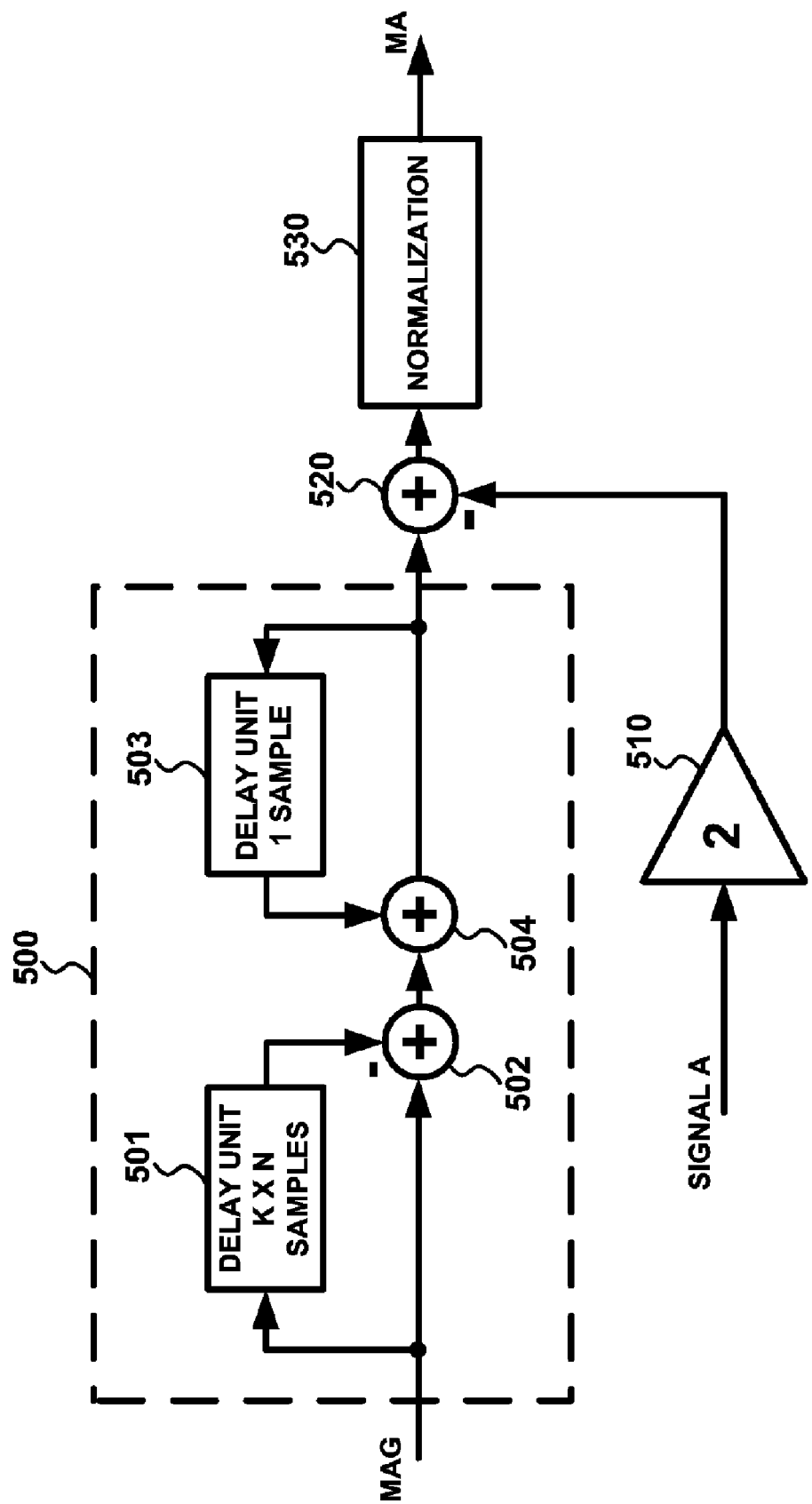
FIG. 5 shows a block diagram of an exemplary embodiment of a moving average estimation block of the preamble peak detection apparatus of FIG. 1.

As shown in FIG. 5, the moving average block 125 includes an IIR filter block 500, a multiplier block 510, a subtraction block 520, and a normalization block 530. The IIR filter block 500 performs time-averaging in a sliding window. A delay block 501 of the IIR filter with K×N samples delay determines the window size. In an exemplary embodiment, K=16, which corresponds to a window size of 16 inner code sequence intervals. The IIR filter block 500 generates an intermediate moving average. The MA output is obtained after a scaled version of SIGNAL A is subtracted from the intermediate moving average and after normalization is applied by a normalization block 530. In the exemplary embodiment of FIG. 5, the multiplier block 510 scales SIGNAL A by a factor of two to account for both the signal and the pulse-shaped signal components in the intermediate moving average. The subtraction of scaled SIGNAL A from the intermediate moving average value results in a more accurate representation of the noise level over the time scale of K×N samples.

Figure 2:
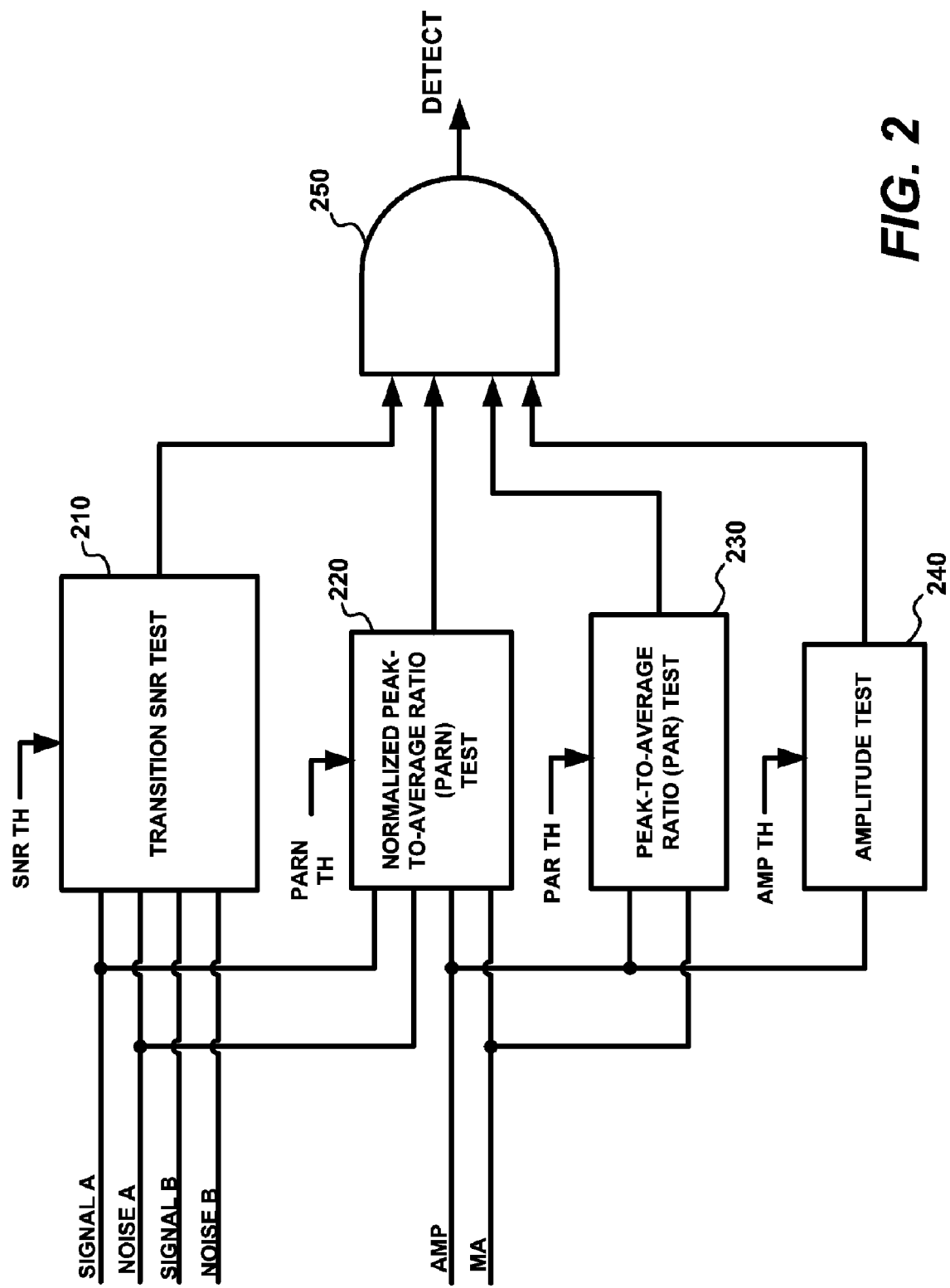
FIG. 2 shows a block diagram of an exemplary embodiment of a statistical test block of the preamble peak detection apparatus of FIG. 1.

As shown in FIG. 1, the instant and time-averaged CCE results, SIGNAL B, NOISE B, SIGNAL A and NOISE A, the output of the moving average block 125, MA, and the output of the complex magnitude block 104, AMP, are provided to the statistical tests block 150. As shown in FIG. 2, the block 150 implements a plurality of statistical tests 210-240 for detecting the preamble synchronization peak based on the aforementioned results. In each test, described more fully below, a statistic value corresponding to each arrival sample is calculated and compared against a respective preset threshold to generate a binary result. The binary results from the four tests are provided to a logic device 250. A positive outcome indicates that the synchronization peak is present and that the current arrival sample marks the tail end of the preamble. No action is taken for a negative outcome, and the same set of tests repeat for the next arrival sample until the synchronization peak is found or a maximum detection time limit is reached.

One of the tests is a normalized peak-to-average (PARN) test 220. In this test, the PARN is calculated by normalizing the peak-to-average ratio, i.e., the ratio between the amplitude (AMP) of the outer code matched filter output and the moving average (MA), with the time-averaged signal-to-noise ratio. The value of PARN is determined in accordance with the following equation:

$$PARN=(AMP/MA)/(SIGNAL\ A/NOISE\ A) \qquad (EQ.\ 1).$$

The value of PARN is then compared to a predetermined threshold value PARN TH and if it is greater than PARN TH, a binary logic high output is generated.

In the PARN calculation, normalization operations are applied twice. The first normalization operation, with respect to MA, is intended to remove the aggregated impacts from various channel impairments that cause amplitude fluctuation in the received samples. The second normalization operation, with respect to (SIGNAL A/NOISE A), is intended to remove the impact from communication system configurations that cause a wide range of SNR in the received samples. With two normalization operations applied in tandem in the PARN test 220, impacts from various channel impairments and the wide range of SNR at the received samples are removed from the value of PARN, and the use of a consistent threshold value PARN TH applicable to a wide range of unknown channel and system configuration conditions is made possible.

The selection of the threshold value PARN TH is primarily influenced by the values of the peak and the side-lobe of the autocorrelation function of the outer code sequence used in the preamble, and follows the Neyman-Pearson decision criterion to reach a balance between the probability of synchronization and the probability of false alarm. The value of PARN TH can be selected based on experimental data. Once it is selected, the same threshold value is expected to operate effectively over a wide range of system configurations and channel conditions. In an exemplary embodiment, PARN TH is selected to be approximately 0.45.

Figure 7:
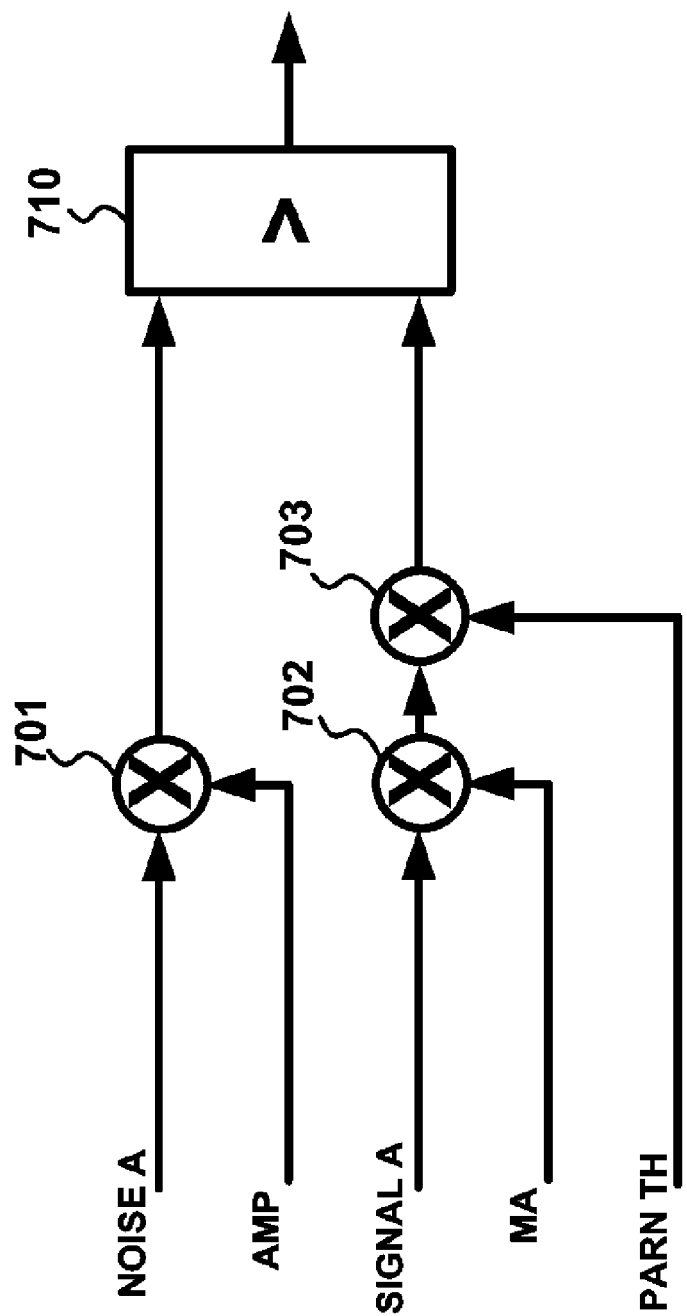
FIG. 7 shows a block diagram of an exemplary embodiment of the PARN test block of the statistical test apparatus of FIG. 2.

A block diagram of an exemplary embodiment of the PARN test block 220 is shown in FIG. 7. The exemplary PARN test block 220 includes three multiplier blocks 701, 702, and 703, and a comparison block 710. The comparison block 710 makes a comparison between (NOISE A×AMP) and (SIGNAL A×MA×PARN TH) and generates a binary output signal accordingly.

As shown in FIG. 2, another test that is implemented in the statistical tests block is a peak-to-average (PAR) test 230. In this test, the peak-to-average ratio, i.e., the ratio between the amplitude (AMP) of the outer code matched filter output and the moving average (MA) is calculated. The value of PAR is determined in accordance with the following equation:

$$PAR=AMP/MA \qquad (EQ.\ 2).$$

The value of PAR is then compared to a predetermined threshold value PAR TH and if it is greater than PAR TH, a binary logic high output is generated.

The PAR test 230 plays a supporting role in the synchronization peak detection decision. It is designed to reduce the possibility of a false synchronization caused by noise samples preceding the preamble signal.

The threshold PAR TH can be selected based on experimental data. The criterion is to set PAR TH so as to weed out the majority of noise samples preceding the preamble signal, while accepting the majority of the correlation side-lobes of the preamble signal. Once it is selected, the same threshold value is expected to operate effectively over a wide range of system configurations and channel conditions. In an exemplary embodiment, PAR TH is selected to be approximately 0.6.

Figure 8:
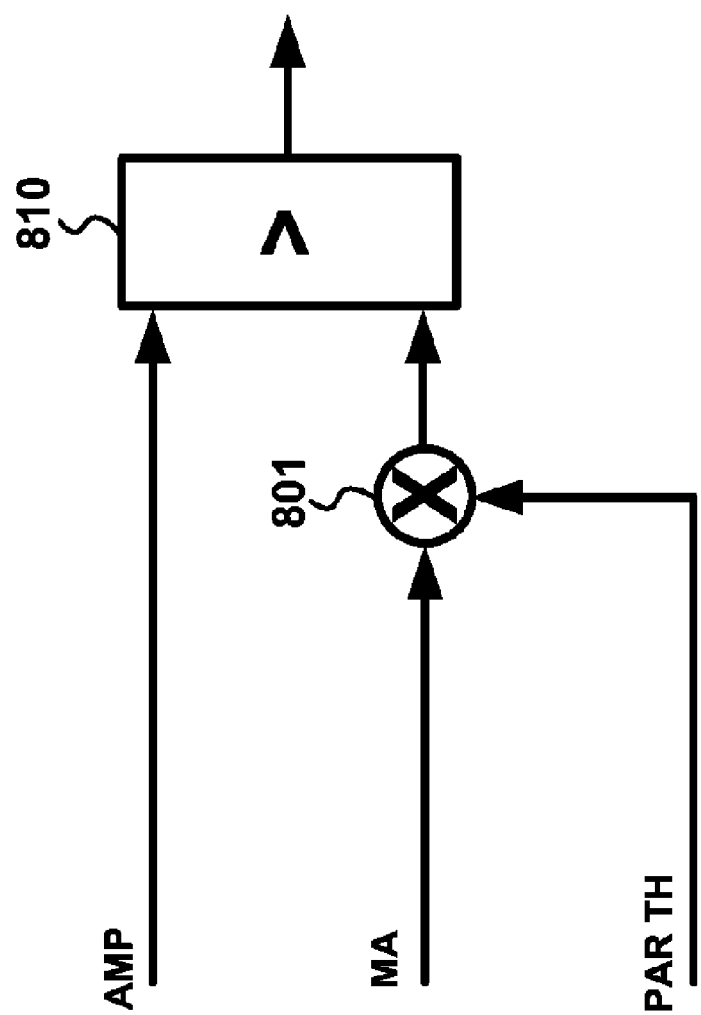
FIG. 8 shows a block diagram of an exemplary embodiment of the PAR test block of the statistical test apparatus of FIG. 2.

A block diagram of an exemplary embodiment of the PAR test block 230 is shown in FIG. 8. The exemplary PAR test block includes a multiplier block 801 and a comparison block 810. The comparison block 810 compares AMP with the product of MA and PAR TH and generates a binary signal accordingly.

As shown in FIG. 2, a third test is the transition SNR test 210. In this test, the ratio between the instant and the time-averaged signal-to-noise ratios, referred to as the SNR ratio or SNRR, is calculated. This ratio is determined in accordance with the following equation:

$$SNRR=(SIGNAL\ B/NOISE\ B)/(SIGNAL\ A(DELAY\ A)/NOISE\ A(DELAY\ A)) \qquad (EQ.\ 3).$$

SIGNAL A (DELAY A) and NOISE A (DELAY A) are copies, respectively, of SIGNAL A and NOISE A delayed by DELAY A samples. The value of SNRR is then compared to a predetermined threshold value SNR TH and if it is less than SNR TH, a binary logic high output is generated.

The transition SNR test 210 is intended to eliminate the potential false synchronization detections caused by spurious PARN peaks during the transition period at the onset of the arrival of the preamble.

At the onset of the arrival of the preamble, the instant SNR represented by (SIGNAL B/NOISE B) increases promptly, while the delayed copy of the time-averaged SNR, SIGNAL A (DELAY A)/NOISE A (DELAY A) that measures the SNR of the noise samples preceding the preamble sequence, remains relatively unchanged. Hence, a sudden increase of SNRR value indicates the arrival of the preamble, and the synchronization decision during this transient period will be disabled.

In an exemplary embodiment, DELAY A=1270 samples. The threshold SNR TH can be selected based on experimental data. Once it is selected, the same threshold value is expected to operate effectively over a wide range of system configurations and channel conditions. In an exemplary embodiment, SNR TH is selected to be approximately 6.

Figure 9:
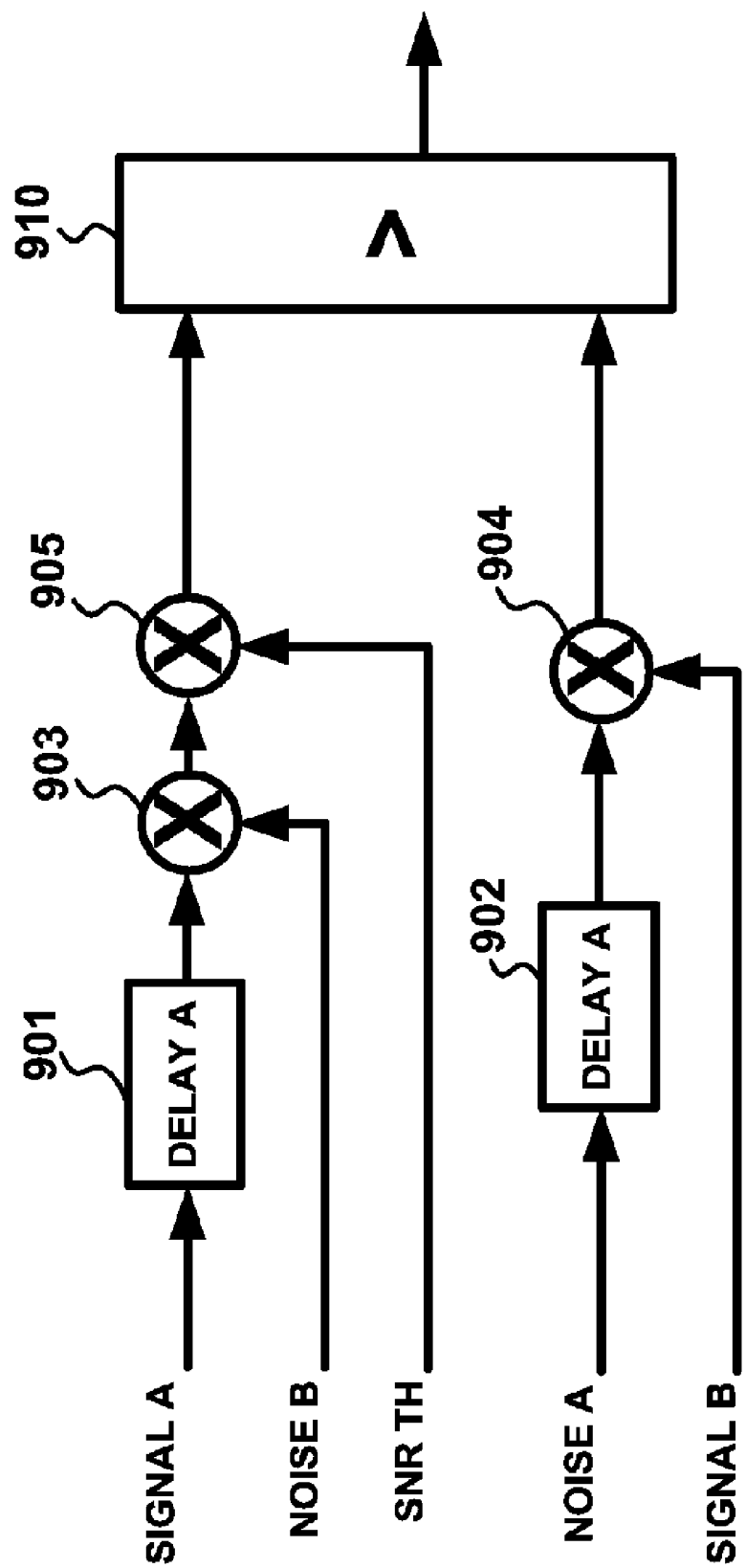
FIG. 9 shows a block diagram of an exemplary embodiment of the transition SNR test block of the statistical test apparatus of FIG. 2.

A block diagram of an exemplary embodiment of the transition SNR test block 210 is shown in FIG. 9. The exemplary transition SNR test block includes two delay blocks 901 and 902, three multiplier blocks 903, 904, and 905, and a comparison block 910. The comparison block 910 generates a binary signal in accordance with the comparison between (SIGNAL A(DELAY A)×NOISE B×SNR TH) and (NOISE A(DELAY A)×SIGNAL B).

As shown in FIG. 2, a fourth test is the amplitude test 240. In this test, the amplitude of the outer code matched filter (AMP) is compared against a minimum amplitude threshold, AMP TH. If AMP is greater than AMP TH, a binary logic high output is generated.

The amplitude test 240 serves to reduce the possibility of a false synchronization indication when the received signal level is substantially below a normal range. The threshold value AMP TH should be empirically selected based on both the minimal received signal level and the particular fixed point implementation of the receiver hardware. In an exemplary embodiment, AMP TH=32.

In the exemplary embodiment of the statistical test block 150 illustrated in FIG. 2, the logic 250 is a logic AND gate that generates a binary logic high output when all four tests generate binary logic high outputs. As such, a preamble detection indication is generated when all four tests are passed. As can be appreciated, the logic 250 is not limited to an AND gate and can be implemented in a variety of equivalent ways to yield the desired logic.

Figure 10:
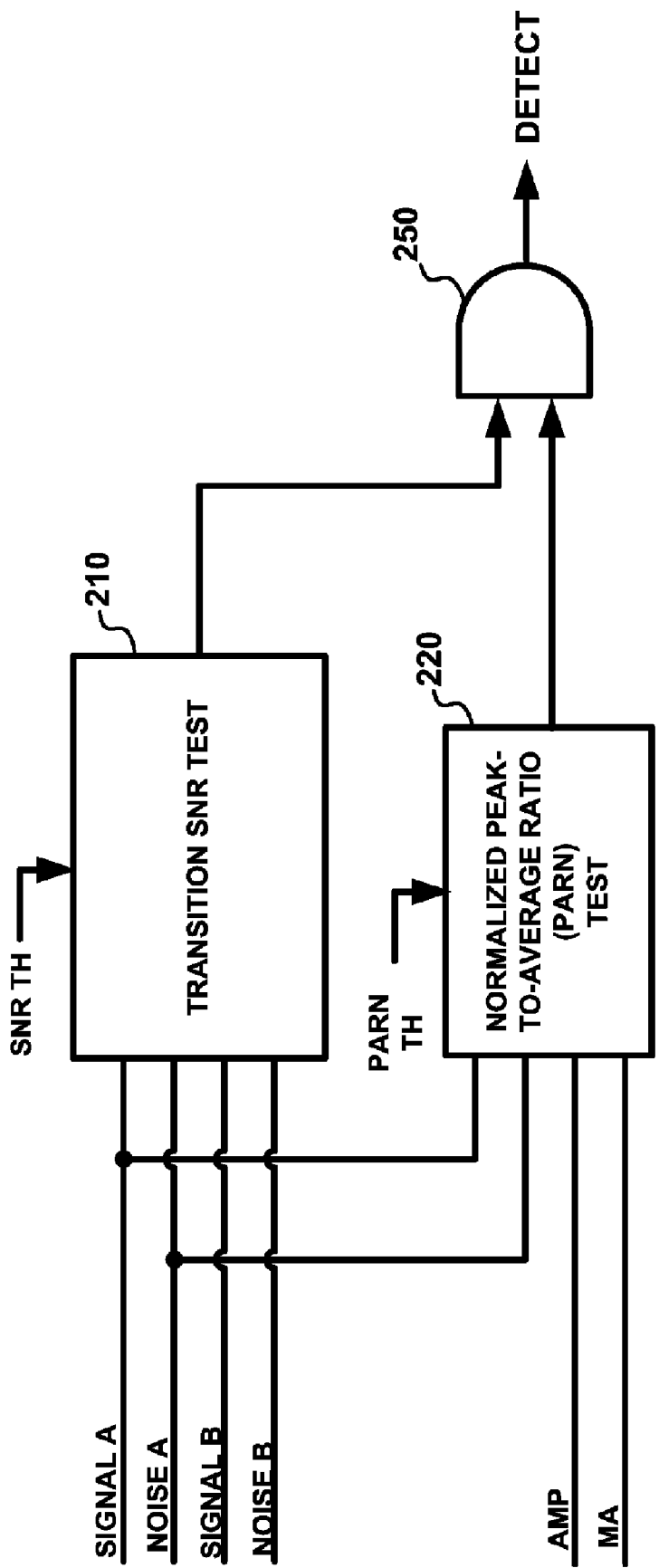
FIG. 10 shows a block diagram of a second exemplary embodiment of a statistical test block of the preamble peak detection apparatus of FIG. 1.

In a further exemplary embodiment illustrated in FIG. 10, the PAR test 230 and the amplitude test 240 are eliminated and the determination of the synchronization peak is based on the transition SNR test 210 and the PARN test 220. In this embodiment, the logic 250 generates a positive value when both the transition SNR test 210 and the PARN test 220 are passed.

Figure 11:
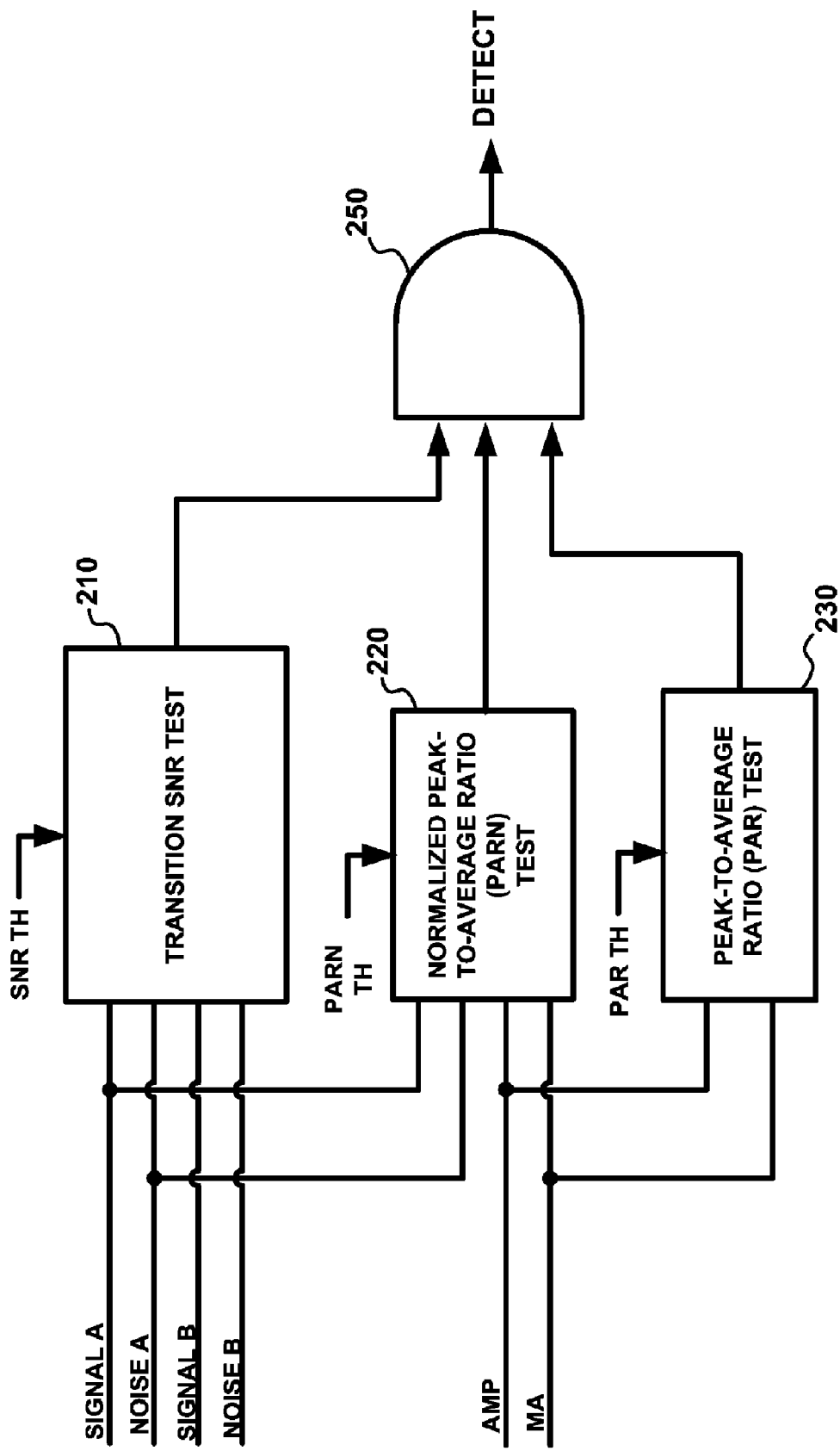
FIG. 11 shows a block diagram of a third exemplary embodiment of a statistical test block of the preamble peak detection apparatus of FIG. 1.
Figure 12:
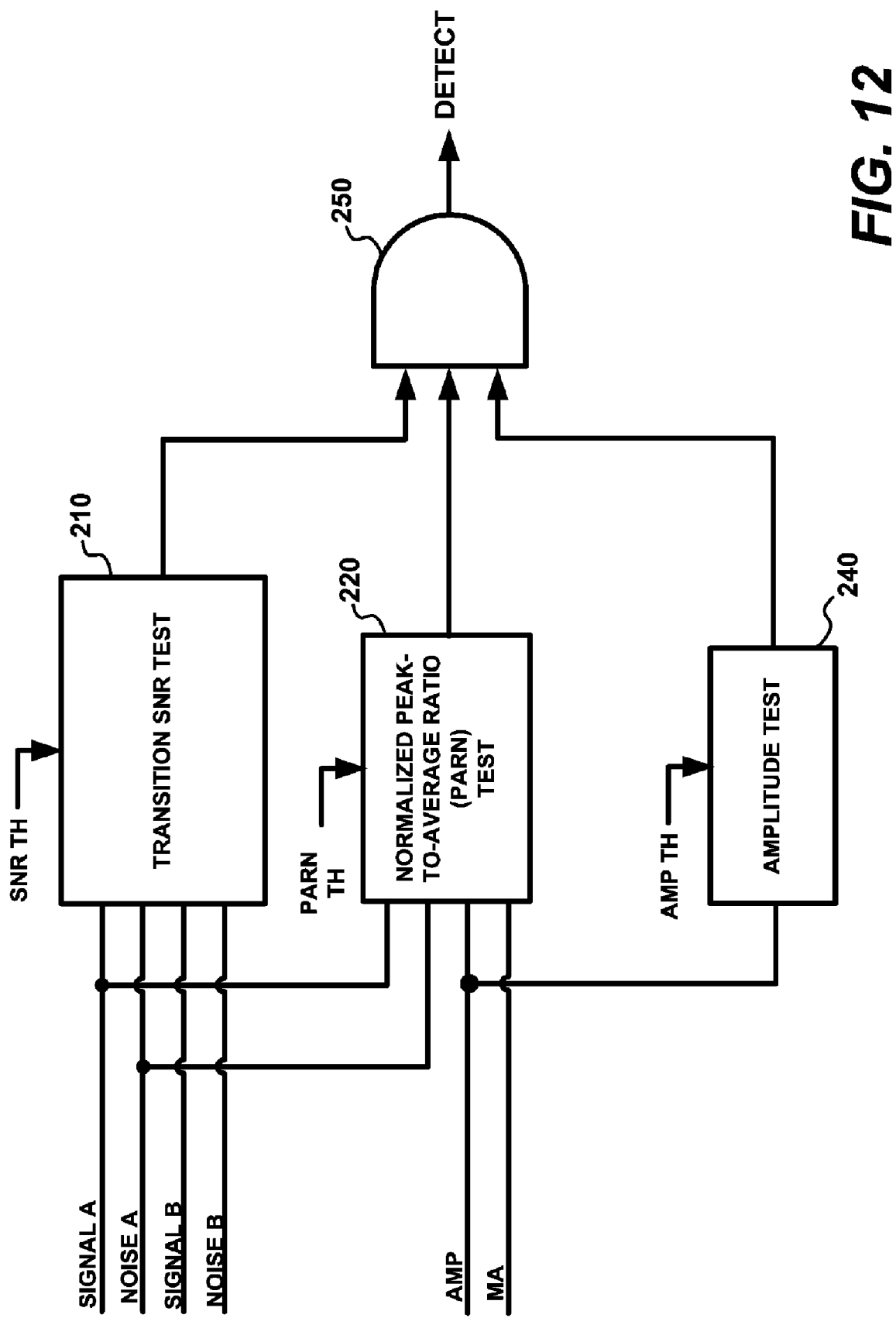
FIG. 12 shows a block diagram of a fourth exemplary embodiment of a statistical test block of the preamble peak detection apparatus of FIG. 1.

In additional exemplary embodiments illustrated in FIGS. 11 and 12, either the PAR test 230 or the amplitude test 240 is eliminated and the synchronization peak detection is based on the transition SNR test 210, the PARN test 220 and either the PAR test 230 or the amplitude test 240. In these embodiments, the logic 250 generates a positive value when the transition SNR test 210, the PARN test 220, and the third test are passed.

Figure 13:
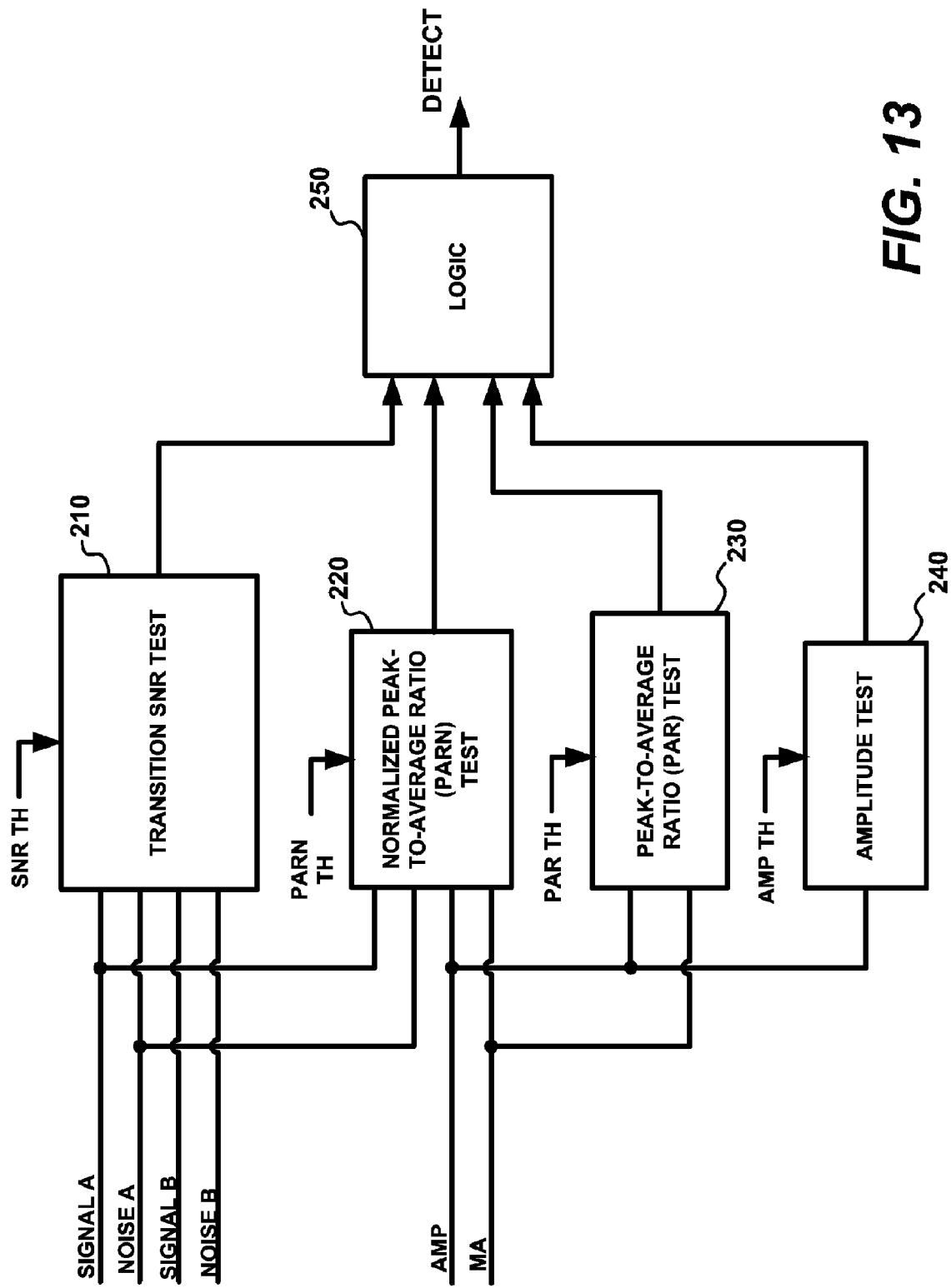
FIG. 13 shows a block diagram of a fifth exemplary embodiment of a statistical test block of the preamble peak detection apparatus of FIG. 1.

In yet a further exemplary embodiment illustrated in FIG. 13, all four tests are performed and the logic 250 is implemented in accordance with the following logic expression:

OUT=(transition SNR test)AND(PARN test)AND
    [(PAR test)OR(amplitude test)]

In this embodiment, the logic 250 generates a positive value when the transition SNR test 210, the PARN test 220, and either the PAR test 230 or the amplitude test 240 are passed.

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. An apparatus for detecting a preamble in a burst-type spread-spectrum communications system, the device comprising:
    means for determining channel signal and noise features;
    means for performing a normalized peak-to-average ratio (PARN) test using the channel signal and noise features, wherein the means for performing the PARN test includes means for determining an outer code matched filter peak-to-average output value, means for normalizing said value by a time-averaged signal-to-noise ratio, and means for comparing said normalized peak-to-average ratio against a threshold value;
    means for performing a transition signal-to-noise ratio (SNR) test using the channel signal and noise features, wherein the means for performing the transition SNR test includes means for determining a ratio between an instant and a delayed time-averaged signal-to-noise ratio and comparing said ratio between an instant and a delayed time-averaged signal-to-noise ratio against a threshold value; and
    means for generating a preamble detection indication if the PARN test and the transition SNR test pass, wherein generating the preamble detection indication is disabled during a transition period at an onset of an arrival of the preamble.

2. The apparatus of claim 1 comprising:
    means for performing a peak-to-average ratio (PAR) test using the channel signal features, wherein the means for generating the preamble detection indication generates a preamble detection indication if the PARN test, the transition SNR test and the PAR test pass.

3. The apparatus of claim 1 comprising:
    means for performing an amplitude test, wherein the means for generating the preamble detection indication generates a preamble detection indication if the PARN test, the transition SNR test and the amplitude test pass.

4. The apparatus of claim 2 comprising:
    means for performing an amplitude test, wherein the means for generating the preamble detection indication generates a preamble detection indication if the PARN test, the transition SNR test, the PAR test and the amplitude test pass.

5. The apparatus of claim 1, wherein the means for determining channel signal and noise features includes:
    means for determining instant channel signal features within non-overlapping inner code sequence intervals;
    means for determining time-averaged channel signal features within a sliding window that covers a plurality of inner code sequence intervals;
    means for estimating noise based on distinguishing and excluding multi-path copies of the signal; and
    means for generating a moving average value indicative of a noise level on the channel.

6. The apparatus of claim 5, wherein the means for determining time-averaged channel signal features includes means for averaging code-phase aligned samples in the sliding window.

7. The apparatus of claim 5, wherein the means for estimating noise includes means for finding a peak and at least one multi-path copy within an inner code sequence interval and means for excluding said at least one multi-path copy from the noise estimation.

8. The apparatus of claim 5, wherein the means for generating the moving average value includes means for subtracting a time-averaged signal level from the moving average value.

9. A method for detecting a preamble in a burst-type spread-spectrum communications system, the method comprising:
   determining channel signal and noise features;
   performing a normalized peak-to-average ratio (PARN) test using the channel signal and noise features, wherein performing the PARN test includes determining an outer code matched filter peak-to-average output value, normalizing said value by a time-averaged signal-to-noise ratio, and comparing said normalized peak-to-average ratio against a threshold value;
   performing a transition signal-to-noise ratio (SNR) test using the channel signal and noise features, wherein performing the transition SNR test includes determining a ratio between an instant and a delayed time-averaged signal-to-noise ratio and comparing said ratio between an instant and a delayed time-averaged signal-to-noise ratio against a threshold value; and
   generating a preamble detection indication if the PARN test and the transition SNR test pass, wherein generating the preamble detection indication is disabled during a transition period at an onset of an arrival of the preamble.

10. The method of claim 9 comprising:
    performing a peak-to-average ratio (PAR) test using the channel signal features, wherein the preamble detection indication is generated if the PARN test, the transition SNR test and the PAR test pass.

11. The method of claim 9 comprising:
    performing an amplitude test, wherein the preamble detection indication is generated if the PARN test, the transition SNR test and the amplitude test pass.

12. The method of claim 9 comprising:
    performing an amplitude test, wherein the preamble detection indication is generated if the PARN test, the transition SNR test, the PAR test and the amplitude test pass.

13. The method of claim 9, wherein determining channel signal and noise features includes:
    determining instant channel signal features within non-overlapping inner code sequence intervals;
    determining time-averaged channel signal features within a sliding window that covers a plurality of inner code sequence intervals;
    estimating noise based on distinguishing and excluding multi-path copies of the signal; and
    generating a moving average value indicative of a noise level on the channel.

14. The method of claim 13, wherein determining time-averaged channel signal features includes averaging code-phase aligned samples in the sliding window.

15. The method of claim 13, wherein estimating noise includes finding a peak and a plurality of multi-path copies within an inner code sequence interval and comprising exclusion of these signal components from the noise estimation.

16. The method of claim 13, wherein generating a moving average value includes subtracting the time-averaged signal level from the moving average value.

* * * * *